(12) United States Patent
Yavitz

(10) Patent No.: US 7,194,148 B2
(45) Date of Patent: Mar. 20, 2007

(54) TECHNIQUE FOR PROVIDING SIMULATED VISION

(76) Inventor: Edward Q. Yavitz, 3828 Spring Creek Rd., Rockford, IL (US) 61114

(*) Notice: Subject to any disclaimer, the term of this patent is extended or adjusted under 35 U.S.C. 154(b) by 484 days.

(21) Appl. No.: 09/948,834

(22) Filed: Sep. 7, 2001

(65) Prior Publication Data

US 2003/0048928 A1    Mar. 13, 2003

(51) Int. Cl.
*G06K 9/54* (2006.01)
(52) U.S. Cl. .............. 382/305; 382/307; 434/43; 704/271
(58) Field of Classification Search ........ 382/154, 382/131, 173, 236, 239, 240, 291, 305, 307; 704/271; 345/7, 419; 434/43, 44
See application file for complete search history.

(56) References Cited

U.S. PATENT DOCUMENTS

| | | | | |
|---|---|---|---|---|
| 5,374,985 A | * | 12/1994 | Beadles et al. | ............ 356/3.11 |
| 5,589,897 A | * | 12/1996 | Sinclair et al. | ............. 351/223 |
| 5,742,521 A | * | 4/1998 | Ellenby et al. | ............. 702/127 |
| 6,031,545 A | * | 2/2000 | Ellenby et al. | ............. 345/632 |
| 6,072,894 A | | 6/2000 | Payne | ......... 382/118 |
| 6,106,123 A | * | 8/2000 | McDonald | ................. 359/872 |
| 6,184,847 B1 | * | 2/2001 | Fateh et al. | .................... 345/8 |

* cited by examiner

Primary Examiner—Sheela Chawan

(57) ABSTRACT

A visual simulation technique is provided to facilitate visual activities, such as reading and movement of a subject through surroundings, for sight-impaired persons. The technique obtains digital images of the surroundings via an image retrieval and sending device, and then provides a real-time audio interpretation of the images via an automated image identification and narration system. The automated system may have communication and computing circuitry, remote human interaction circuitry, and other components for either computer-based or human-based identification and narration of the acquired images.

24 Claims, 5 Drawing Sheets

Person 18

FIG. 2
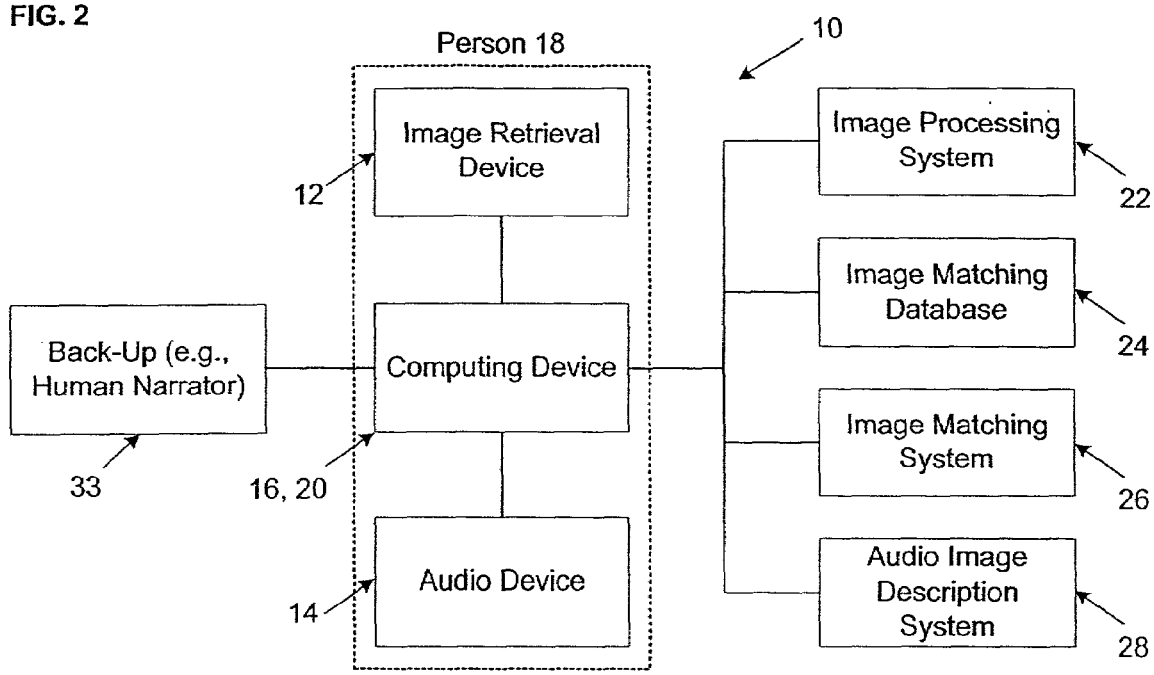
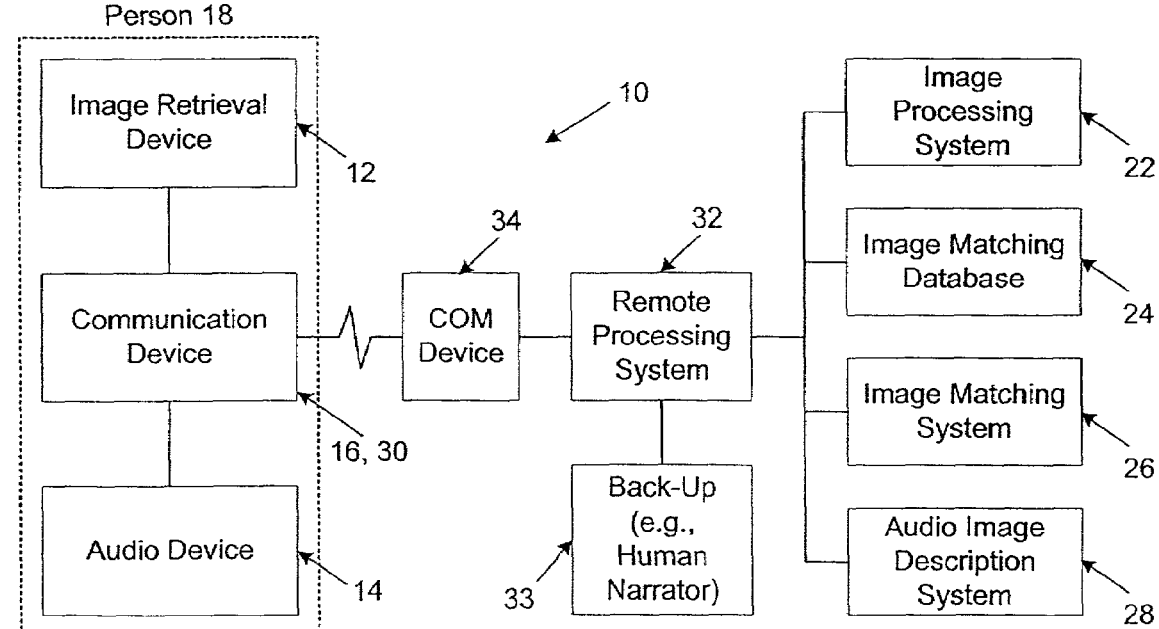
FIG. 3

TECHNIQUE FOR PROVIDING SIMULATED VISION

FIELD OF THE INVENTION

The present invention relates generally to artificial sight systems, and more particularly, to vision aids for the sight impaired. The present invention provides a technique for identifying and verbally describing visual input such as newsprint or environmental surroundings to the sight impaired.

BACKGROUND OF THE INVENTION

Many individuals, animals and mechanical devices have limited or no visualization and maneuvering capabilities. Although many maneuvering devices have been designed for robotics, none of these devices can aptly describe the environment to a blind or poorly sighted individual as they move through the environment. For example, robotics may use sonar, infrared, acoustic and microwave sensors to maneuver through the environment. These sensors can indicate the existence of objects and boundaries, such as walls, yet they do not provide any identification of the object or boundary. A blind or poorly sighted individual requires more detailed visual information to successfully maneuver through the surroundings. The mere existence of a barrier is insufficient information for an individual to maneuver through complex environments, which typically include doors, streets, transportation vehicles, and various electrical and mechanical devices.

Accordingly, it would be advantageous to provide a system and method for instantly communicating visual information of the surroundings to an individual to facilitate visual perception and maneuvering through the surroundings. The blind or poorly sighted individual could upon demand get a verbal description of objects close at hand, such as the food on a dinner plate or the contents of a newspaper article and a description of a photograph. It also would be advantageous to provide detailed real-time information about more distant surroundings, such as the sky, bodies of water and other background images, to provide a better visual perception and mental picture of the surroundings.

SUMMARY OF THE INVENTION

A visual simulation technique is provided for visualizing and maneuvering through surroundings. The technique obtains an image of the surroundings via a digital-image retrieval and sending device worn by the visually impaired person and then provides an audio interpretation of the image via an automated image matching system. The technique also includes a system and method for requesting interpretive input from human volunteers by means of a wireless network. For example, images retrieved by the digital-image retrieval and sending device may be displayed through an Internet browser for volunteer interpretation and audio feedback.

In one aspect, the present technique provides a vision aid comprising an image retrieval device and an image identification assembly communicatively coupled to the image retrieval device. The vision aid also has an image narrator communicatively coupled to the image identification device.

In another aspect, the present technique provides a method of visualizing a surrounding environment. The method comprises obtaining an image in a desired viewing orientation and identifying the image via an image processing assembly. The method also comprises describing the surrounding environment based on the image identified. This would include real-time reading of printed material, viewing photographs and descriptions of contiguous environmental objects such as furniture, paintings, rugs, walls, and steps; in fact, a running commentary on whatever the poorly-sighted individual aims the image retrieval device at.

BRIEF DESCRIPTION OF THE DRAWINGS

The invention will hereafter be described with reference to the accompanying drawings wherein like reference numerals denote like elements, and:

FIG. 2 is a diagrammatical illustration of the present technique illustrated in FIG. 1;

FIG. 3 is a diagrammatical illustration of the present technique utilizing wireless communication technology;

DETAILED DESCRIPTION OF EXEMPLARY EMBODIMENTS

As described in detail below, the present technique facilitates maneuvering and simulated vision for blind and sight impaired individuals. The present technique also may be utilized to enhance maneuvering and visualization for individuals already having such capabilities. For example, the present technique may facilitate maneuvering and visualization for individuals having restricted visual fields due to glaucoma or Retinitis Pigmentosa, macular degeneration, diabetic maculopathy, color blindness, poor depth perception, and various other visual problems. The present technique also may be utilized to teach verbal descriptions of images to a machine, an animal, a person, or any other subject.

Figure 1:
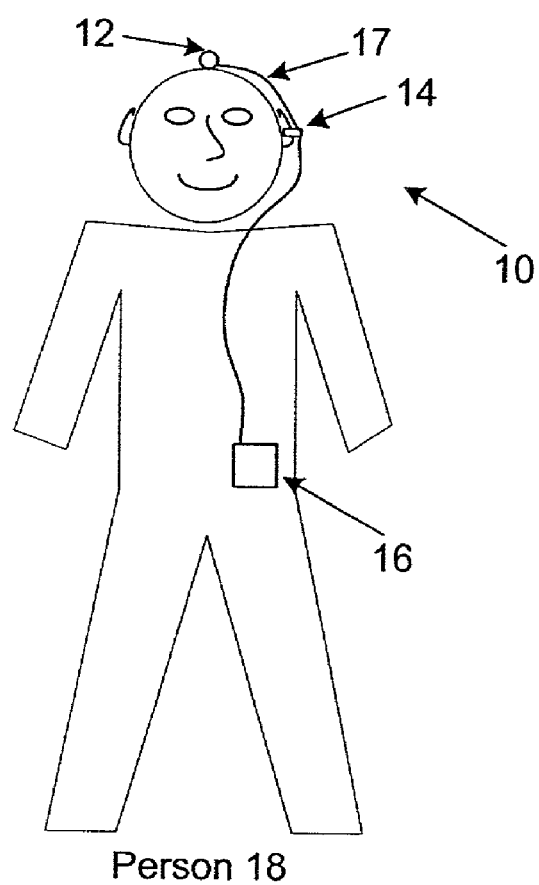
FIG. 1 is an illustration of the present technique being used by a person.

As illustrated in FIG. 1, the present technique comprises a system 10 having an image retrieval device 12, an audio device 14, and a control unit 16 coupled together via wiring 17 and disposed on a subject 18 (e.g., a human, an animal, a robot, etc.) The system 10 is configured to obtain an image of, for example, the person's surroundings via the image retrieval device 12, transmit the image to the control unit 16 via the wiring 17, and then provide an audio description of the image to the person 18 via the audio device 14. The system 10 may process the image locally via the control unit 16 or it may process the image remotely via wireless communication technology and a remote processing system. As described in detail below, the remote processing system may embody various electronics (e.g., communications devices, computing circuitry, etc.), software, and persons. It should also be noted that the wiring 17 may be replaced by wireless communication technology, thereby making the system 10 more compact and less obtrusive.

The image retrieval device 12 may embody a still-photography or video camera having a variety of photographic technologies, such as digital image processing. If the image retrieval device 12 embodies a video camera, then the system 10 may analyze the surroundings of the person by evaluating a plurality of video frames within the video feed obtained by the image retrieval device 12. The system 10 also may have a plurality of image retrieval devices 12, such as illustrated in FIGS. 6–9, to provide a more accurate or wider range of view of the surroundings. The image retrieval device 12 may be mounted on the person's neck, around the person's head, on a hat or other clothing, above the person's ear, or in any other suitable location within the line of sight of the person 18.

The audio device 14 may embody a variety of audio output devices, such as an earphone, a headphone, a speaker system, and various other systems capable of transmitting the audio description from the control unit 16 to the person 18. Accordingly, the audio device 14 may be mounted in one or both ears of the person 18, on the person's clothing, or in any other suitable location.

As discussed above, the system 10 may embody a variety of configurations having local and/or remote processing capabilities. FIG. 2 is an illustration of the system 10 having local processing capabilities. As illustrated, the system 10 comprises the image retrieval device 12, the control unit 16, and the audio device 14, all of which may be mounted on the person 18. In this exemplary embodiment, the control unit 16 comprises a computing device 20 disposed locally on the subject (i.e., the person 18).

The computing device 20 may comprise a variety of computing circuitry, devices and software to facilitate the processing and identification of the image. The computing circuitry may include a processor, memory, input/output circuitry, a keypad, a pointing device, communications circuitry, a disk drive, a display and various other desired circuitry and components. The computing device 20 also may comprise various application-specific hardware and software. For example, as illustrated in FIG. 2, the computing device 20 comprises an image processing system 22, an image matching database 24, an image matching system 26, and an audio image description system 28.

The image processing system 22 may include a variety of hardware and software configured for processing the image obtained by the image retrieval device 12. For example, the image processing system 22 may include algorithms for image resampling, noise and blur reduction, color transformation and enhancement, image sharpening, image compression and various other desired functions. Moreover, if the image retrieval device 12 does not embody a digital imaging device, then the image processing system 22 also may include algorithms for converting the video feed from the image retrieval device 12 to a digital format.

The image matching database 24 may comprise a plurality of images, image parameters, image characteristics (e.g., color and geometrical characteristics), and various other desired features for identifying the image obtained by the image retrieval device 12. For example, a particular image may be characterized by a unique set of numbers and characters. The actual contents of the image matching database 24 also can be tailored to the specific application. For example, if the system 10 is used by a visually impaired person, then the image matching database 24 may comprise a plurality of images or image characteristics of the various surroundings that the person may encounter on a day-to-day basis. In the exemplary embodiment of FIG. 2, the image matching database 24 may simply include image characteristics or parameters, such as image colors, geometries (e.g., size, shape, depth, angles, patterns, morphologies, etc.), and other suitable characteristics, of common environments and surroundings. For example, the image matching database 24 may include parameters characterizing a door, a door handle, a street, a sidewalk, a curb, a crosswalk, a car, a bus, a train, an animal, a man, a woman, a specific individual (e.g., an animal or human), a light switch, an oven, a table, a bathroom, a blue sky, a sunny day, grass, dirt, a river, a lake, and any other desired images. The image matching database 24 would also be capable of reading newsprint or lettering from magazines or computer monitors.

The image matching system 26 may comprise a variety of hardware and software configured for comparing and matching the plurality of images, such as the image obtained by the image retrieval device 12 and the images in the image matching database 24. The image matching system 26 may directly compare images, or it may analyze the image obtained by the image retrieval device 12 and determine the desired parameters for comparison and matching with those stored in the image matching database 24. For example, the image matching system 26 may identify unique geometries, colors and patterns in the image that may be used to find a best match within the image matching database 24. As mentioned above, each image may be characterized by a unique set of numbers and characters, which may be rapidly used to match and identify surroundings. For example, the present technique may utilize Principle Component Analysis (PCA) developed at the Massachusetts Institute of Technology Media Lab (Cambridge, Mass.) and face recognition software developed by Viisage Technology, Inc. (Littleton, Mass.).

The audio image description system 28 may comprise audio descriptions stored for each of the images in the image matching database 24. Alternatively, the audio image description system 28 may comprise a text-to-voice conversion system (i.e., a voice generator) configured to create an audio description of the image corresponding to a textual description stored in the image matching database 24. However, the system 10 may comprise both audio descriptions and textual descriptions, depending on the capabilities of the control unit 16. The computing capacity of the embodiment illustrated in FIG. 2 may be relatively limited to provide a more compact size of the system 10. Accordingly, the computing device 20 may simply have textual descriptions and a text-to-voice conversion system.

The computing device 20 also may include a local or remote backup system 33, such as a remote processor or human narrator. For example, a network of human volunteers maybe accessible by the computing device 20 to supplement or back up the local visualization resources. The volunteers would be able to perform the automated functions of a remote processing system (e.g., systems 22–28) by viewing and describing the images as they are captured and electronically transmitted to them via a network, such as the Internet. Each volunteer viewer could log onto the viewing website and speak into a microphone connected to their personal computer, describing the video image. The narrative description would then be wirelessly sent to the sight-impaired person. The computing device 20 also may provide a choice between computer-generated or human-generated image identification and narration.

By utilizing wireless communication technology, the embodiment illustrated in FIG. 3 potentially has a greater computing capacity to enhance the image matching and descriptive capabilities of the foregoing system 10. As illustrated, the system 10 comprises the image retrieval device 12, the control unit 16, and the audio device 14. In this exemplary embodiment, the control unit 16 comprises a communication device 30, which may include various wireless communication technologies including radio frequency, cellular, blue tooth and other suitable technologies. Accordingly, the control unit 16 (i.e., the communication device 30)

may be compacted into a relatively smaller housing having fewer electronics and other circuitry, thereby making the control unit 16 less obtrusive and less costly to the consumer.

As illustrated, the system 10 of FIG. 3 also comprises a remote processing system 32, which is accessible via a communication device 34. The communication device 34 may include a variety of wireless and standard communication assemblies, including ground-based and sky-based systems. For example, the communication device 34 may comprise a satellite system and various networks. It should also be noted that the system 10 of FIG. 3 may comprise a plurality of remote processing systems, which may be individually or collectively utilized to identify the image obtained by the image retrieval device 12.

The remote processing system 32 also may comprise one or all of the systems 22–28 described above with reference to FIG. 2, or a back-up system 33. For example, the communication device 30 may comprise some computing circuitry and software, such as illustrated with the computing device 20 of FIG. 2, while the remaining systems are disposed on the remote processing system 32. However, in the embodiment of FIG. 3, the remote processing system 32 comprises the image processing system 22, the image matching database 24, the image matching system 26, and the audio image description system 28. In addition to the features discussed above, the remote processing system 32 also may comprise compression algorithms to facilitate wireless transfer of images and data between the communication device 30 and the remote processing system 32.

In the embodiment of FIG. 3, the present technique also may utilize another individual's eyes to perform the remote image identification and narration. Accordingly, images may be obtained via the image retrieval device 12, transmitted to the remote processing system 32 via the communication devices 30 and 34, and analyzed and described by a remote individual. An audio description may then be transmitted back to the person 18 via the communication devices 30 and 34 and the audio device 14. In this exemplary embodiment, the remote individual may comprise any or all of the remote image processing components, namely, the image processing system 22, the image matching database 24, the image matching system 26 and the audio image description system 28. For example, the remote individual may act as a backup for an automated computer system, the remote individual may be an integral component of an otherwise computerized image analysis system, or the automated computer system may act as a backup for the remote individual.

In any of the foregoing scenarios, the present technique may utilize a network of individuals (e.g., volunteers) connected via the Internet. These individuals would receive images from the visually impaired person's image retrieval device 12 and read or describe in real time those images in the sight impaired person's line of sight. Thus, if a blind person is walking across the street by means of the automated system (e.g., the remote processing system 32), but loses contact with it, the present technique allows for an instantaneous transfer of the visual images from the image retrieval system 12 to an Internet website that displays the images for individuals to interpret and give audio feedback.

These remote individuals may be volunteers (e.g., at a retirement home, a school, etc.), employees of an image narration service, friends or relatives of the person 18, or any suitable individual having acceptable eyesight. The remote individuals also may be located at various remote locations from the person 18 and the remote processing system 32. For example, the remote processing system 32 may comprise a communication system for transmitting the images to the remote persons and then receiving audio descriptions from the remote persons.

Figure 4:
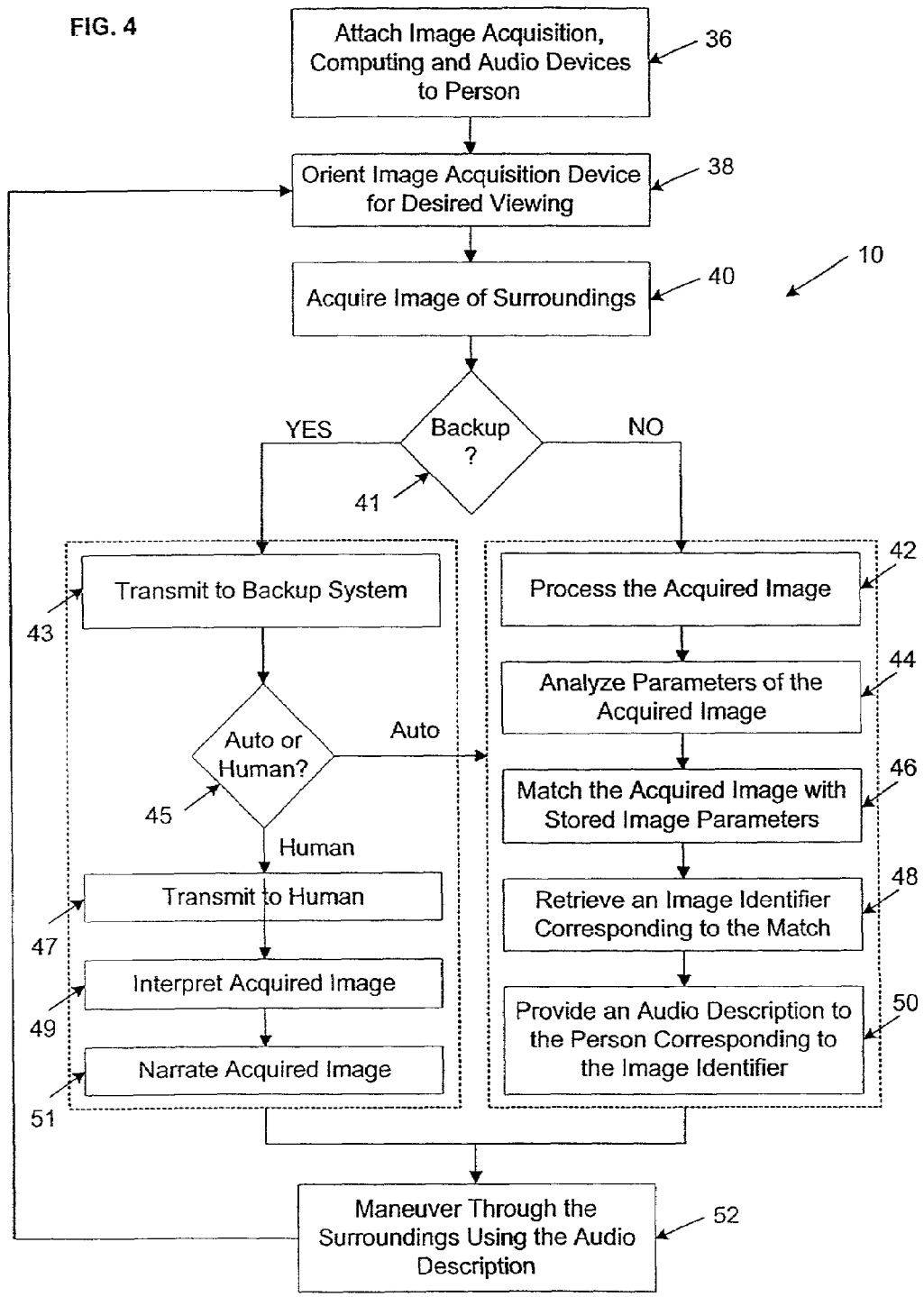
FIG. 4 is a flowchart of the present technique illustrated in FIG. 2.
Figure 5:
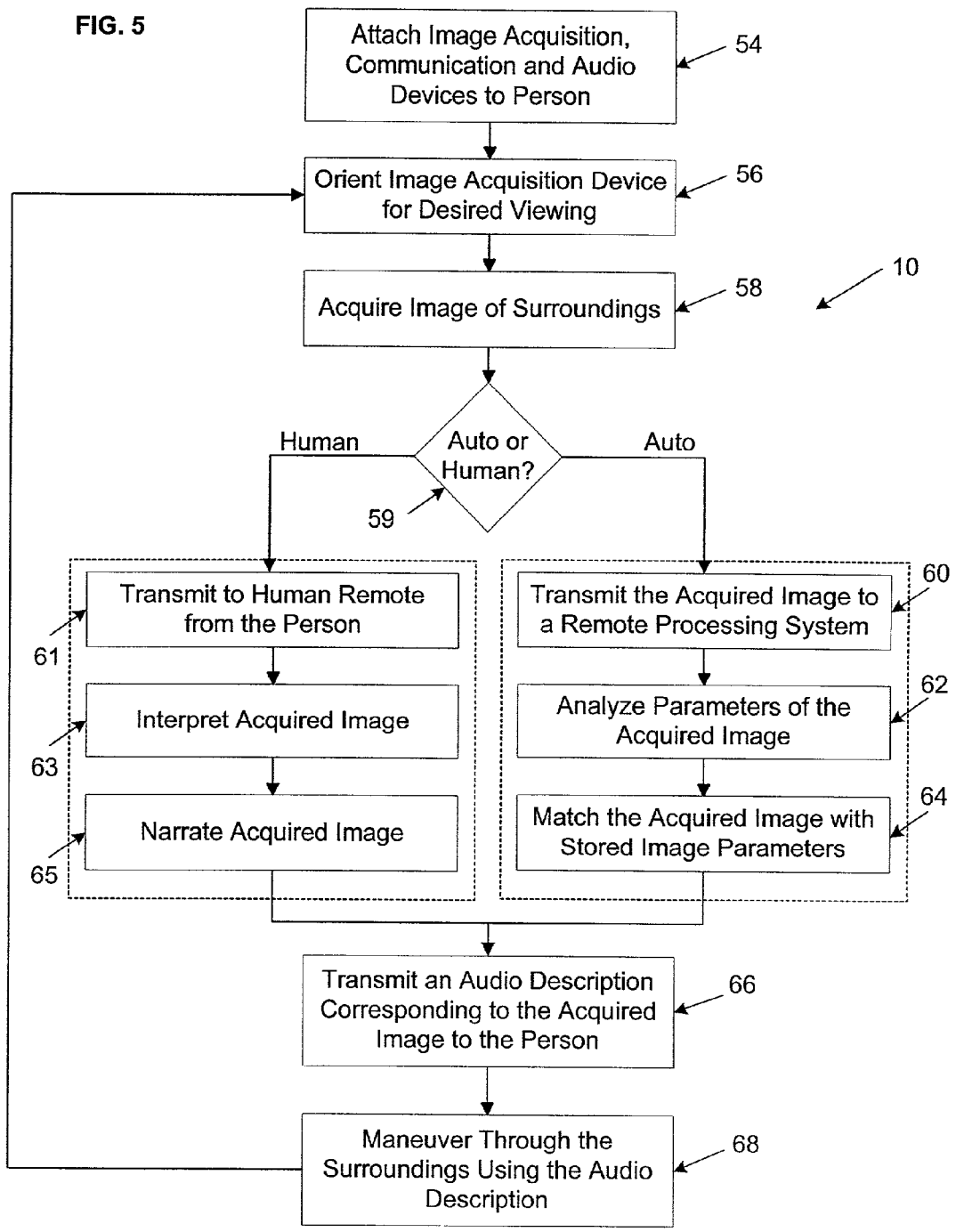
FIG. 5 is a flowchart of the present technique illustrated in FIG. 3.

Referring now to FIGS. 4 and 5, exemplary operational flow charts are provided for the systems illustrated in FIGS. 2 and 3, respectively. As illustrated in FIG. 4, which refers to the "local-based system" of FIG. 2, the present technique is initiated by attaching the image acquisition, computing and audio devices to the person (block 36). For example, refer to FIG. 1 for an exemplary device configuration of the system 10.

The technique then proceeds to orient the image acquisition devices for the desired viewing (block 38), such as a forward line of sight. In operation, the system 10 acquires an image of the surroundings (block 40) in the desired viewing orientation for the person 18. The system 10 also may include a backup system 33, such as illustrated in FIG. 2. Thus, the system 10 may analyze the status of the local system (e.g., the computing device 20) to determine if the backup system 33 is necessary for continued operation. The system 10 also may provide a choice of simulated vision using either the backup system or the local system. Accordingly, as illustrated in FIG. 4, the system 10 may proceed to determine whether the backup system 10 is desired for the simulated vision (block 41).

If the backup system is not desired, then the computing device 20 then proceeds to process the acquired image (block 42), to analyze parameters of the acquired image (block 44), and to match the acquired image with stored image parameters (block 46), as discussed above. The computing device 20 may then retrieve an image identifier corresponding to the match (block 48). For example, as discussed above, the image identifier may comprise a verbal description, a textual description, an image name or any other suitable identifier to facilitate image description of the observed surroundings. Accordingly, the system 10 then proceeds to provide an audio description to the person 18 corresponding to the image identifier (block 50). As discussed above, the audio description may be generated on-the-fly or from a database, depending on the capabilities of the system 10.

If the backup system is desired, then the system 10 proceeds to transmit the acquired image to the backup system (block 43), which may be a local or remote backup system. The system 10 may then determine whether an automated or human-based vision simulator is desired (block 45) to assist the sight impaired individual. If an automated vision simulator is desired, then the system 10 may initiate a local backup or remote system having similar functions as the primary local system (e.g., steps 42–50). If a human vision simulator is desired, then the system may initiate communication with a remote human network. Accordingly, the system 10 may transmit the acquired image to a remote human (block 47), who then interprets the acquired image (block 49) and provides a narration of the acquired image (block 51). This human-based technique may utilize a variety of earth-based and sky-based networks, including the Internet and wireless technologies. For example, the human narrator may view the acquired image via an Internet browser and either type or speak a narration of the acquired image.

The audio description or narration of the acquired image is then communicated to the person 18. Accordingly, the person 18 is able to maneuver through the surroundings using the audio description (block 52). The system 10 then repeats itself by reorienting the image acquisition device in the desired viewing angle (block 38) and proceeding to acquire a new image of surroundings (block 40).

As illustrated in FIG. 5, which refers to the "local-to-remote communicating system" of FIG. 3, the present technique is initiated by attaching the image acquisition, communication and audio devices to the person (block 54). For example, refer to FIG. 1 for an exemplary device configuration of the system 10. The technique then proceeds to orient the image acquisition devices for the desired viewing (block 56), such as a forward line of sight. In operation, the system 10 acquires an image of the surroundings (block 58) in the desired viewing orientation for the person 18. The system 10 may then proceed with either human or automatic/computer based vision simulation (block 59). The particular vision simulation technique may be preset by the person, preset by the manufacturer, or one type may serve as a backup for the other. For example, human-based vision simulation may be a backup for the automatic/computer-based vision simulation. Nevertheless, at least one of the two techniques will be used to provide simulated sight for the sight-impaired individual.

If automatic vision simulation is desired, then the system 10 proceeds to wirelessly transmit the acquired image to the remote processing system (block 60), which may perform some or all of the image processing and identification functions, as discussed above with reference to FIG. 3. The system 10 then proceeds to analyze parameters of the acquired image (block 62) and to match the acquired image with stored image parameters (block 64).

If human vision simulation is desired (e.g., using a remote image interpreter/narrator), then the system proceeds to transmit the acquired image to a human located remote from the person (block 61). This remote human then interprets the acquired image (block 63) and provides a narration of the acquired image (block 65). As discussed above, a variety of networks and video displays may be used to facilitate interpretation and narration of the acquired image by the remote human.

In both human-based and automatic/computer-based techniques, an audio description or narration corresponding to the acquired image is then wirelessly transmitted to the person (block 66). The person 18 is then able to maneuver through the surroundings using the audio description (block 68). The system 10 then repeats itself by reorienting the image acquisition device in the desired viewing angle (block 56) and proceeding to acquire a new image of surroundings (block 58). In the case of human intervention, the volunteer viewer could verbally guide and direct the person 18 to turn their head or move in certain directions in order to better acquire images 56.

Figure 6:
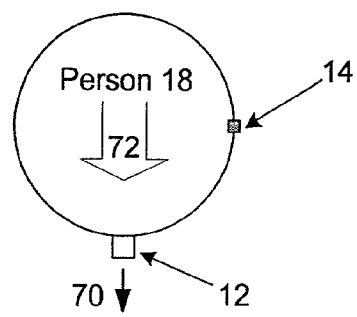
FIGS. 6–9 illustrate various mounting orientations of the present technique relative to a line of sight of the person.

As illustrated in FIGS. 6–9, the system 10 may utilize any number of image retrieval devices 12, which may be disposed in a variety of directions and positions on the person 18. As illustrated in FIG. 6, the system 10 may have the image retrieval device 12 disposed in a viewing direction 70 directly in line with the person's forward line of sight 72. However, if the system 10 has sufficient computing capabilities (e.g., remote and/or local), then the system 10 may comprise a plurality of image retrieval devices 12 to improve the accuracy and viewing angle for the person 18.

Figure 7:
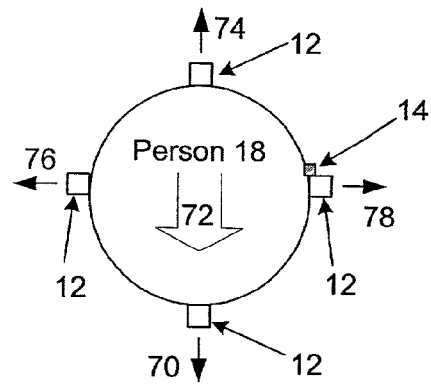

For example, as illustrated in FIG. 7, the system 10 may comprise four of the image retrieval devices 12 disposed symmetrically about the person 18 to provide a full 360-degree viewing angle. In this embodiment, the image retrieval devices 12 are oriented in viewing directions 70, 74, 76 and 78, which correspond to the person's forward line of sight 72, a rear view and side views, respectively. Accordingly, the system 10 allows the person to react to surroundings in all directions. This would be highly advantageous to sighted persons with unique requirements for simultaneous vision on all sides, such as soldiers in combat. The user of this device would have a field of vision for objects within a perimetry surrounding the user based upon the sensitivity and quality of the image-capturing device and thus could encompass infrared, night vision, or magnification.

Figure 8:
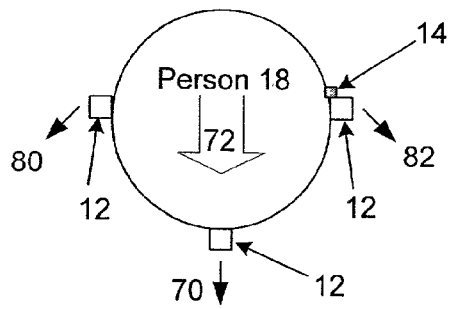

The system 10 also may have multiple image retrieval devices 12 oriented in a general forward direction to improve the visualization in the person's forward line of sight 72. For example, as illustrated in FIG. 8, the system 10 has three image retrieval devices 12, which are disposed in a front position and opposite sides of the person 18. The image retrieval devices 12 disposed on opposite sides of the person 18 may be directed in any suitable angle (e.g., perpendicular, tangent, 45°, etc.), such as angles 80 and 82, to improve the accuracy and/or viewing angle for the visualization. For example, the angle may be selected to provide considerable overlap between the three image retrieval devices 12.

Figure 9:
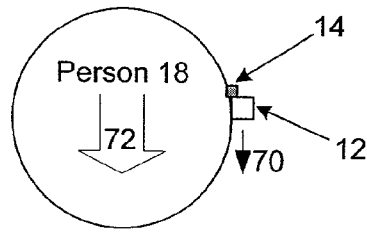

The system 10 may also integrate the image retrieval device 12 and the audio device 14 into a single compact unit, which may be mounted on the person's ear or in any other suitable location. FIG. 9 illustrates such an integral unit, which has the image retrieval device 12 and the audio device 14 mounted on a side of the person 18 with the audio device 14 extending into the person's ear. In this exemplary embodiment, the system 10 has the image retrieval device 12 oriented in the viewing direction 70 parallel to the person's forward line of sight 72. It also should be noted that this embodiment may have the control unit 16 integrated into the single compact unit with the image retrieval device 12 and the audio device 14.

It will also be understood that the foregoing description is of a preferred embodiment of this invention, and that the invention is not limited to the specific form and application shown. The invention may comprise various local and remote electronics and software, which may be tailored for a specific person, animal, robot or other subject. These and other modifications may be made in the design and arrangement of the elements without departing from the scope of the invention as expressed in the appended claims.

What is claimed is:

1. An artificial sight system for use by an individual, comprising:
    an artificial sight system for use by an individual, having:
        an image retrieval device able to obtain an image of a surrounding, the image retrieval device being configured for carrying on an individual;
        a communication device coupled to the image retrieval device, wherein the communication device is configured to transmit the image to a remote processing system comprising an image identifier and an image describer; and
        an audio device coupled to the communication device and configured to transmit an audio description of the surrounding to the individual carrying the image retrieval device.

2. The artificial sight system of claim 1, wherein the image retrieval device comprises a digital camera.

3. The artificial sight system of claim 1, wherein the image retrieval device comprises a plurality of image retrieval devices in multiple desired viewing orientations.

4. The artificial sight system of claim 1, wherein the image retrieval device, the communication device and the audio device comprise mounting structures for attachment to the individual.

5. The artificial sight system of claim 1, wherein the communication device comprises wireless communication circuitry.

6. The artificial sight system of claim 1, wherein the image identifier comprises an image processor configured to process an image obtained by the image retrieval device, an image characteristic database, and an image matcher configured to identify a best match from the image characteristic database with the image.

7. The artificial sight system of claim 6, wherein the image characteristic database comprises parameters for a plurality of images, the parameters comprising color and geometrical characteristics.

8. The artificial sight system of claim 1, wherein the image identifier and the image describer comprise a human interpreter.

9. A method of visualizing a surrounding environment, comprising:
   providing an artificial sight system for use by an individual;
   obtaining an image in a desired viewing orientation;
   identifying the image via an image processor;
   audibly describing the surrounding environment based on the image identified; and
   wirelessly communicating image information between a communication device attached to the person and the image processor disposed remote from the person, wherein obtaining the image and audibly describing the surrounding environment are performed via an image retrieval device and an audio device, respectively, attached to the person, further wherein identifying and audibly describing are performed via an individual acting as the image processor.

10. The method of claim 9, wherein obtaining the image comprises obtaining a digital image of the surrounding environment.

11. The method of claim 9, wherein obtaining the image comprises electronically capturing the image of a field of view of a perimetry surrounding a user.

12. The method of claim 11, wherein electronically capturing the image comprises magnifying the image.

13. The method of claim 11, wherein electronically capturing the image comprises adapting to lightness levels in the field of view.

14. The method of claim 11, wherein electronically capturing the image comprises sensing distances to objects in the field of view.

15. The method of claim 9, wherein obtaining the image comprises obtaining a plurality of images in multiple desired viewing orientations.

16. The method of claim 9, wherein identifying the image comprises matching image characteristics of the image with a best match from an image characteristic database of environmental images.

17. The method of claim 16, wherein matching image characteristics comprises analyzing geometrical characteristics.

18. The method of claim 17, wherein matching image characteristics comprises analyzing color characteristics.

19. The method of claim 9, wherein obtaining the image and audibly describing the surrounding environment are performed via an image retrieval device and an audio device, respectively, attached to a person.

20. The method of claim 19, comprising wirelessly communicating image information between a communication device attached to the person and the image processor disposed remote from the person.

21. The method of claim 20, wherein identifying and audibly describing are performed via an individual acting as the image processor.

22. The method of claim 9, wherein identifying and audibly describing comprise:
   wirelessly communicating the image from a user to a network;
   displaying the image to an individual accessing the network; and
   wirelessly communicating an audio narration of the image from the individual to the user.

23. The method of claim 22, wherein displaying the image comprises displaying the image through an Internet website.

24. The method of claim 23, comprising obtaining the audio narration from the individual.

* * * * *